United States Patent
Singh et al.

(10) Patent No.: US 8,667,866 B2
(45) Date of Patent: Mar. 11, 2014

(54) MACHINING TOOL BLANK AND METHOD OF FORMING

(75) Inventors: Anshul Singh, Columbus, OH (US); Andreas Haar, Zell am Harmersbach (DE)

(73) Assignee: Diamond Innovations, Inc., Worthington, OH (US)

( * ) Notice: Subject to any disclaimer, the term of this patent is extended or adjusted under 35 U.S.C. 154(b) by 377 days.

(21) Appl. No.: 12/981,694

(22) Filed: Dec. 30, 2010

(65) Prior Publication Data

US 2011/0154954 A1     Jun. 30, 2011

Related U.S. Application Data

(60) Provisional application No. 61/291,668, filed on Dec. 31, 2009.

(51) Int. Cl.
*B21K 21/00*     (2006.01)

(52) U.S. Cl.
USPC ........................................................ 76/101.1

(58) Field of Classification Search
USPC .......... 408/144, 145, 227–230; 407/118, 119; 76/101.1, 108.1–108.6; 428/577–585
See application file for complete search history.

(56) References Cited

U.S. PATENT DOCUMENTS

| | | | | |
|---|---|---|---|---|
| 237,013 A * | 1/1881 | Hammond | .................... | 76/108.1 |
| 240,984 A * | 5/1881 | Farmer | ......................... | 76/108.6 |
| 599,537 A * | 2/1898 | Steudner | ...................... | 76/108.6 |
| 1,022,135 A * | 4/1912 | Heinkel et al. | ............... | 76/108.1 |
| 1,467,491 A * | 9/1923 | Oliver | ......................... | 76/108.6 |
| 1,485,444 A * | 3/1924 | Twogood | ..................... | 76/108.6 |
| 1,499,797 A * | 7/1924 | Woods | ......................... | 76/108.1 |
| 1,641,321 A * | 9/1927 | Cubley | ........................ | 76/108.1 |
| 1,683,502 A * | 9/1928 | Tunnell | ....................... | 76/108.2 |
| 1,747,117 A * | 2/1930 | Klein | ........................... | 76/108.6 |
| 1,887,372 A | 11/1932 | Emmons | | |
| 1,887,373 A * | 11/1932 | Emmons et al. | ............. | 408/144 |
| 2,201,159 A * | 5/1940 | Clow | ........................... | 76/108.6 |
| 2,832,238 A * | 4/1958 | Brinker et al. | ............... | 76/108.1 |
| 2,858,718 A * | 11/1958 | Kohler | ......................... | 408/144 |
| 2,903,921 A * | 9/1959 | Andreasson | .................. | 408/230 |
| 3,106,973 A | 10/1963 | Christensen | | |
| 3,459,073 A * | 8/1969 | Conover | ...................... | 76/108.1 |
| 3,701,188 A * | 10/1972 | Wall et al. | ..................... | 76/101.1 |
| 3,893,353 A * | 7/1975 | Lahmeyer | .................... | 76/108.6 |
| 3,991,454 A * | 11/1976 | Wale | ............................ | 408/144 |
| 4,259,090 A | 3/1981 | Bovenkerk | | |
| 4,356,873 A * | 11/1982 | Dziak | ........................... | 407/118 |
| 4,370,149 A | 1/1983 | Hara et al. | | |
| 4,373,593 A | 2/1983 | Phaal | | |

(Continued)

FOREIGN PATENT DOCUMENTS

EP        0272913        6/1988
EP      506238 A2 *      9/1992

(Continued)

*Primary Examiner* — Jason Daniel Prone
(74) *Attorney, Agent, or Firm* — Frank Gao, Esq.

(57) ABSTRACT

A blank for use in forming a machining tool having a body with at least one end face and at least two recesses formed in the end face including a first recess wherein the first recess extends from the end face at an angle of about 15° to about 60° and a second recess continuing from the first recess extending from the end face at an angle of about 40° to about 90°.

36 Claims, 11 Drawing Sheets

(56) References Cited

U.S. PATENT DOCUMENTS

| | | | | |
|---|---|---|---|---|
| 4,428,260 A | * | 1/1984 | Eby | 76/101.1 |
| 4,527,643 A | | 7/1985 | Horton et al. | |
| 4,627,503 A | | 12/1986 | Horton | |
| 4,629,373 A | | 12/1986 | Hall | |
| 4,688,652 A | * | 8/1987 | Crist | 408/144 |
| 4,694,710 A | | 9/1987 | Phaal | |
| 4,713,286 A | | 12/1987 | Bunting et al. | |
| 4,714,385 A | | 12/1987 | Komanduri | |
| 4,724,728 A | | 2/1988 | Phaal | |
| 4,762,445 A | | 8/1988 | Bunting et al. | |
| 4,802,895 A | | 2/1989 | Burnand et al. | |
| 4,991,467 A | * | 2/1991 | Packer | 76/108.6 |
| 5,022,801 A | * | 6/1991 | Anthony et al. | 408/144 |
| 5,028,177 A | * | 7/1991 | Meskin et al. | 408/145 |
| 5,031,484 A | | 7/1991 | Packer | |
| 5,038,641 A | * | 8/1991 | Shen et al. | 76/108.6 |
| 5,038,642 A | * | 8/1991 | Alverio et al. | 76/108.6 |
| 5,065,647 A | * | 11/1991 | Johnson | 76/108.6 |
| 5,115,697 A | | 5/1992 | Rodriguez et al. | |
| 5,119,714 A | | 6/1992 | Scott et al. | |
| 5,195,403 A | * | 3/1993 | Sani et al. | 76/108.6 |
| 5,248,317 A | | 9/1993 | Tank et al. | |
| 5,299,471 A | * | 4/1994 | Tank et al. | 76/108.1 |
| 5,370,717 A | | 12/1994 | Lloyd et al. | |
| 5,433,655 A | * | 7/1995 | Shiokawa et al. | 76/108.6 |
| 5,443,337 A | | 8/1995 | Katayama | |
| 5,467,670 A | * | 11/1995 | Alverio | 76/108.6 |
| 5,472,376 A | | 12/1995 | Olmstead et al. | |
| 5,498,480 A | | 3/1996 | Tank et al. | |
| 5,505,272 A | * | 4/1996 | Clark | 76/108.2 |
| 5,544,713 A | * | 8/1996 | Dennis | 408/145 |
| 5,590,727 A | | 1/1997 | Tank et al. | |
| 5,611,251 A | | 3/1997 | Katayama | |
| 5,630,478 A | * | 5/1997 | Schimke | 76/108.6 |
| 5,685,671 A | | 11/1997 | Packer | |
| 5,735,648 A | * | 4/1998 | Kleine | 408/144 |
| 5,807,032 A | * | 9/1998 | Abe | 407/118 |
| 6,029,544 A | | 2/2000 | Katayama | |
| 6,055,886 A | * | 5/2000 | Tank et al. | 76/108.1 |
| 6,132,148 A | | 10/2000 | Thompson | |
| 6,158,304 A | * | 12/2000 | Packer et al. | 76/108.1 |
| 6,182,533 B1 | | 2/2001 | Tank | |
| 6,371,702 B1 | * | 4/2002 | DeWald et al. | 408/227 |
| 6,564,887 B2 | * | 5/2003 | Hong et al. | 408/145 |
| 6,588,520 B2 | * | 7/2003 | Hauptmann | 76/108.1 |
| 7,214,009 B2 | * | 5/2007 | Quanz | 76/108.1 |
| 2003/0017015 A1 | * | 1/2003 | Strubler | 408/230 |
| 2008/0247899 A1 | * | 10/2008 | Cho et al. | 76/108.6 |
| 2010/0098505 A1 | * | 4/2010 | Garrick et al. | 76/108.6 |
| 2010/0111627 A1 | * | 5/2010 | Bae | 76/108.1 |
| 2010/0272531 A1 | * | 10/2010 | Shavit | 76/108.6 |
| 2010/0316456 A1 | * | 12/2010 | George | 408/230 |
| 2011/0280678 A1 | * | 11/2011 | Bohn et al. | 76/108.6 |
| 2012/0288337 A1 | * | 11/2012 | Sampath | 76/108.6 |
| 2012/0308319 A1 | * | 12/2012 | Sampath et al. | 408/145 |

FOREIGN PATENT DOCUMENTS

| | | | |
|---|---|---|---|
| JP | 63251130 A | * | 10/1988 |
| KR | 20010013691 | | 2/2001 |
| WO | 9729877 | | 8/1997 |
| WO | 2011027341 A1 | | 3/2011 |

* cited by examiner

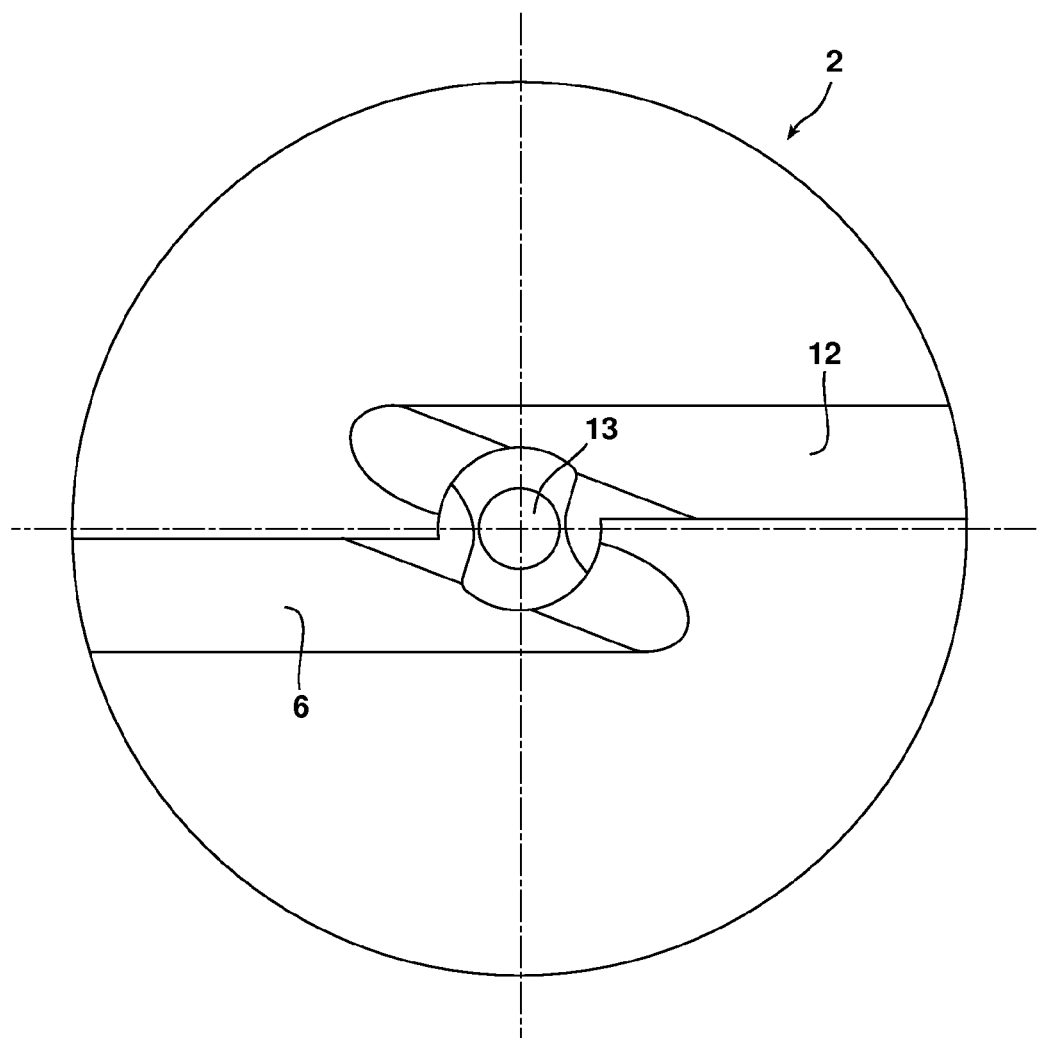

MACHINING TOOL BLANK AND METHOD OF FORMING

TECHNICAL FIELD

The invention which is the subject of this application relates to the formation of machining tools and the method making machining tool blanks for the manufacture of same, the tools provided with a machining tip and/or machining faces formed at least partially by a suitable material containing abrasive polycrystalline diamond or cubic boron nitride referred to respectively as PCD and PCBN.

BRIEF DESCRIPTION OF THE DRAWINGS

FIG. 6 is a top view of the machining tool blank.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 45%-55%.

Figure 1:
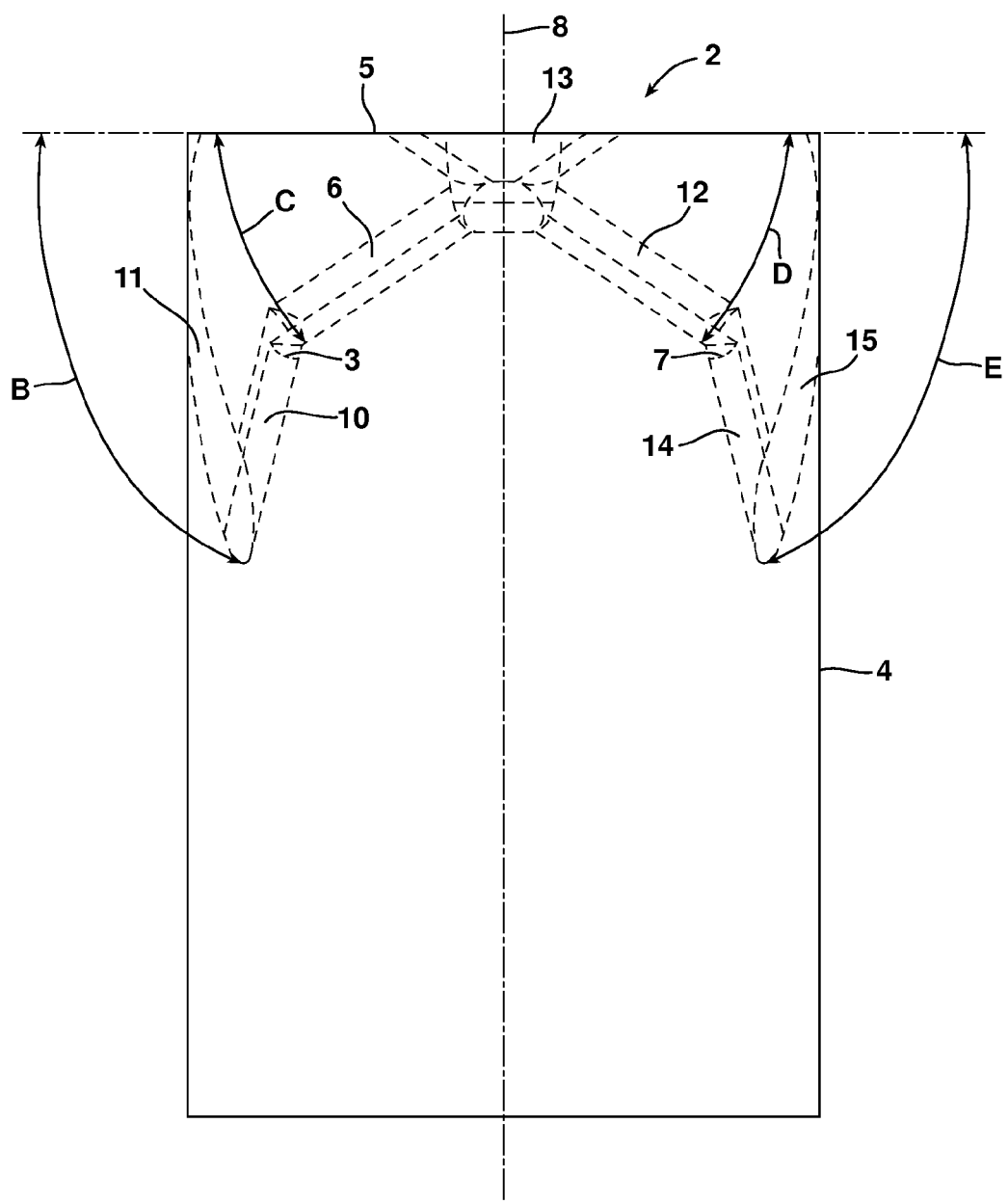
FIG. 1 is a side plan view of an embodiment of a machining tool blank.

FIG. 1 depicts a side plan view of machining tool blank. The machining tool blank may be made of any suitable material such as tungsten carbide. The machining tool blank 2 has a body 4 including at least one end face 5. At least two recesses 6, 10, and/or 12, 14 are formed in end face 5. As shown in FIG. 1, first recess 6 extends from the at least one end face 5 at an angle C of about 33°. Angle C may range from about 15° to about 60°. A second recess 10 continues from said first recess 6 and extends from the end face 5 at an angle B of about 77°. Angle B may range from about 40° to about 90°. As shown in FIG. 1, the first recess 6 and the second recess 10 converge at first radius 3.

As shown in FIG. 1, first recess 6 and second recess 10 form a first side recess 11. As further shown in FIG. 2, first side recess 11 extends along at least one side of said blank from axial center point 8 of the blank at an angle A of about 30°. Angle A may range from about 0° to about 50°.

Figure 7A:
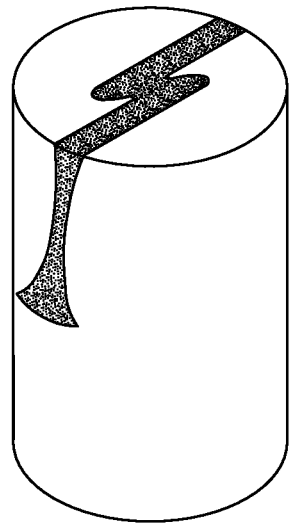
FIGS. 7a-7d show embodiments of geometries of recesses of the machining tool blank.
Figure 7B:
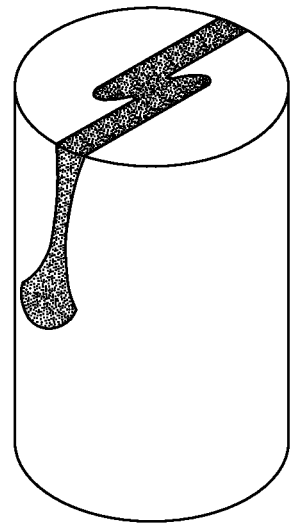
Figure 7C:
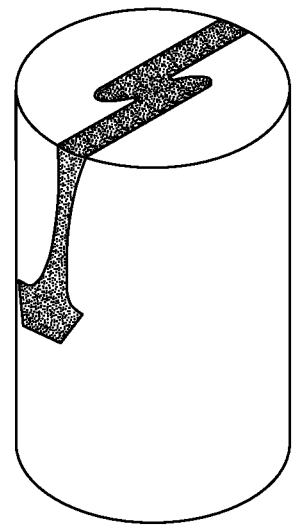
Figure 7D:
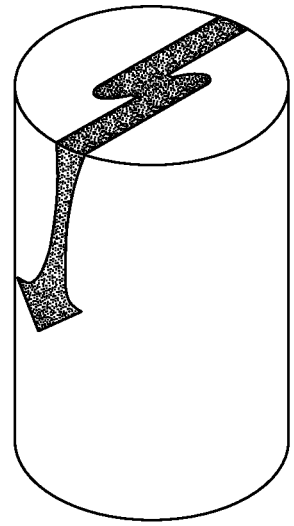
Figure 8A:
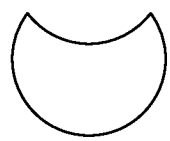
FIGS. 8a-8e show embodiments of geometries of radii of the machining tool blank.
Figure 8B:
Figure 8C:
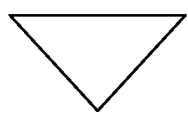
Figure 8D:
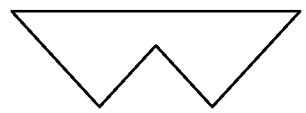
Figure 8E:
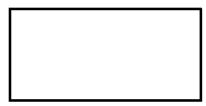

In an embodiment, as shown in FIG. 1, the blank 2 may further include a third recess 12 extending from end face 5 at an angle D of about 33°. Angle D may range from about 15° to about 60°. A fourth recess 14 continues from third recess 12 and extends from the end face 5 at an angle E of about 77°. Angle E may range from about 40° to about 80°. Third recess 12 and fourth recess 14 converge at second radius 7. As shown in FIG. 1, third recess 12 and fourth recess 14 form a second side recess 15. As further shown in FIG. 2, second side recess 15 extends along at least one side of said blank from axial center point 8 of the blank at an angle F of about 30°. Angle F may range from about 0° to about 50°. The aforementioned side recesses may be any shape and may be curved or flare at the bottom of the recess. End portion 39 of side recess may be any shape. Examples of geometries of end portions are shown in FIGS. 7a-7c.

Also shown in FIGS. 8a-8e,. the geometries of radius 3 and radius 7 are shown.

Examples of geometries include sickle-shaped, flat, curved, triangular, square, rectangular, zig-zag, etc. and combinations thereof.

Figure 5:
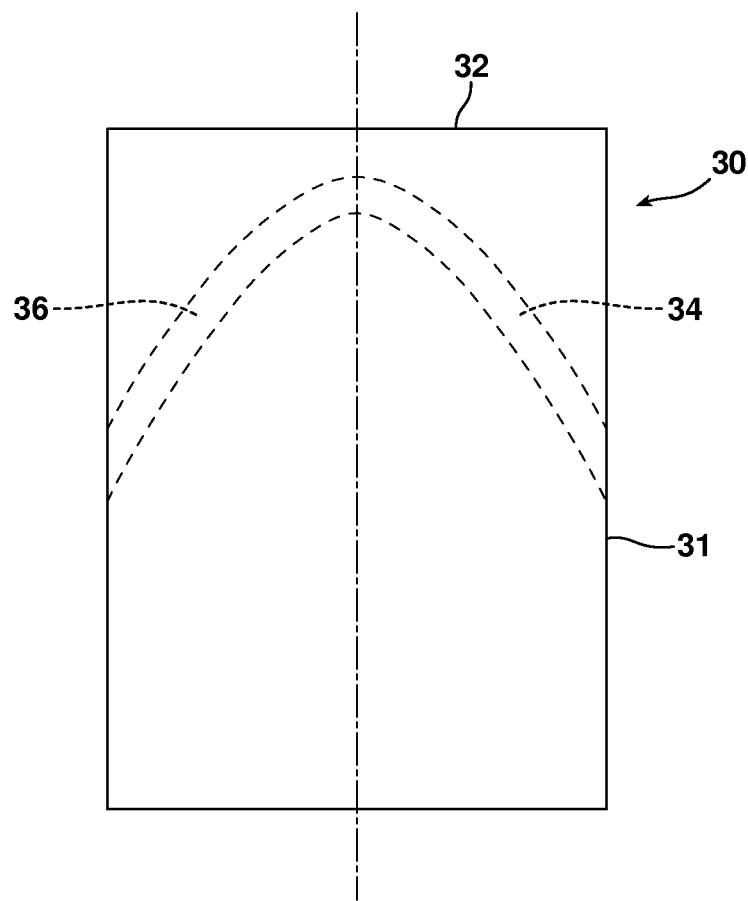
FIG. 5 is a side review of an embodiment of a machining tool blank.

Although a blank having from two to four recesses has been described, additional recesses may be present. Further, although the recesses are described as converging at a radius, alternatively, the recess may be continuous without a radius as shown in FIG. 5. FIG. 5 shows blank 30 having at least one recess 34. A blank 30 for use in forming a machining tool may comprise: a body 31 comprising at least one end face 32; and at least one recess 34 formed in said at least one end face and extending from the at least one end face 32 at an angle of about 15° to about 90°. Additionally, recess 36 may be present. The recesses 34, 36 may form one continuous recess or may be two separate recesses that do not connect (not shown). Optionally, a cavity (not shown) may be present, to join to separate recesses. In an embodiment, as shown in FIG. 6 a cavity 13 may be made in the blank 2. The cavity may be any shape and serves to join recesses 6 and 12.

Although cylindrical blanks have been described and shown, it is possible that the machining tool blanks have other shapes such as rectangular, triangular, hexagonal, octagonal, etc.

Figure 2:
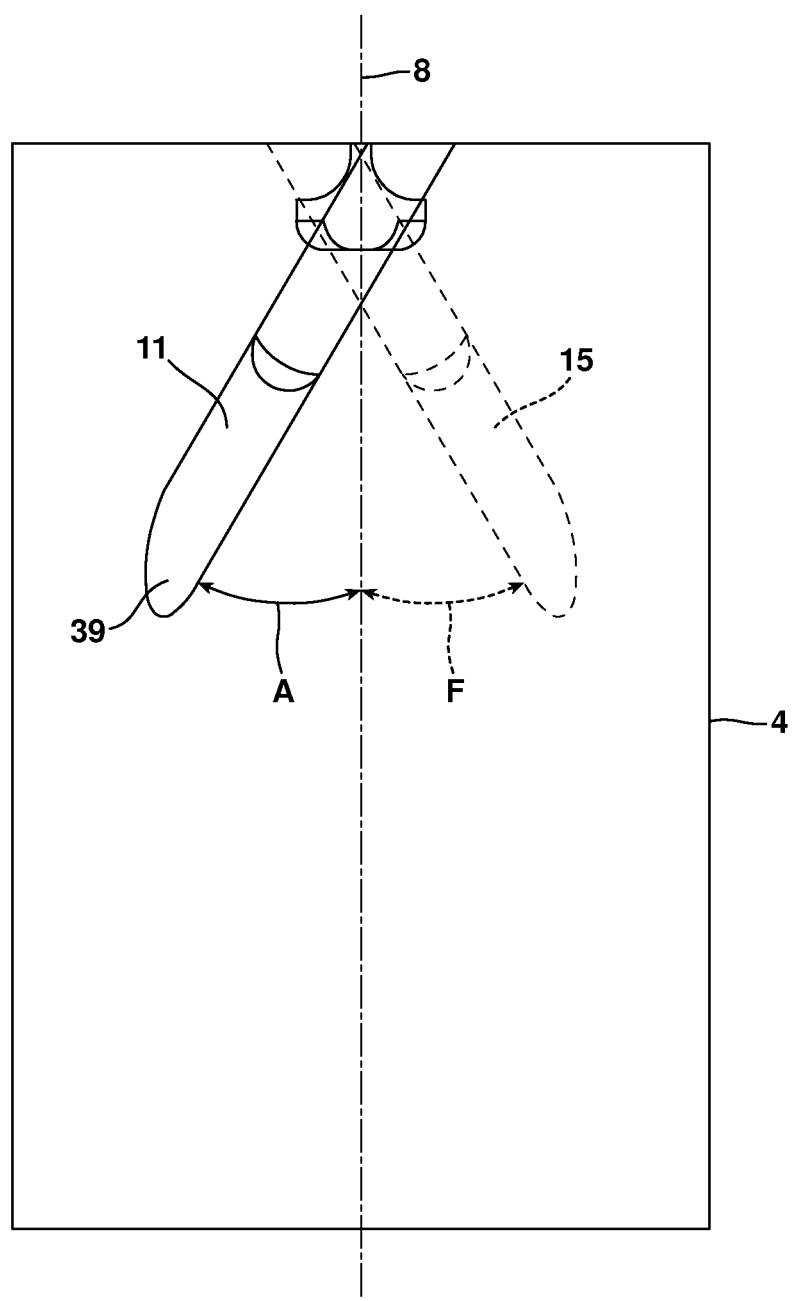
FIG. 2 is a side view of an embodiment of a machining tool blank.
Figure 4:
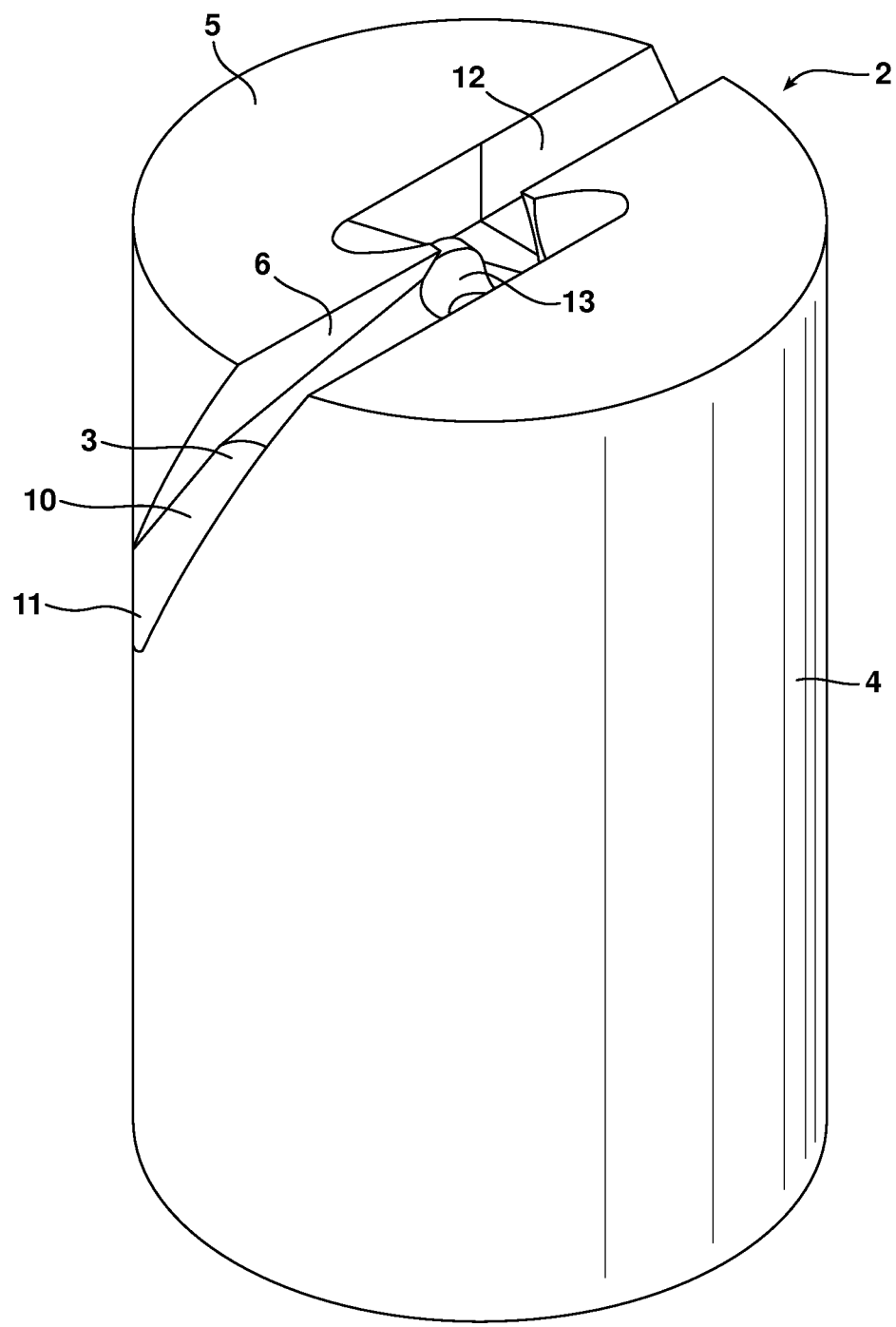
FIG. 4 is a perspective view of an embodiment of a machining tool blank.

FIG. 4 illustrates the perspective view of blank 2 of FIGS. 1 and 2. In FIG. 4, machining tool blank 2 has body 4 including at least one end face 5. In FIG. 4, first recess 6, second recess 10 radius 3 and third recess 12 are shown. Cavity 13 joins recesses 6 and 12.

To form the machining tool blank, and in turn the machining tool, the blank 2 is first machined to remove the material from which the blank is made into the required form including the formation of the recess portion(s). Typically, the recesses are provided in a location such that the PCD or PCBN material subsequently formed therein will be located to form at least part of the subsequently formed machining end face(s) of the tool in order to obtain the benefit of the PCD or PCBN material used.

The machining tool blank 2 may be formed from carbide such as tungsten carbide or other materials of similar hardness. A mass of abrasive particles, e.g., polycrystalline diamond (PCD) or polycrystalline cubic boron nitride PCBN, of a mean size of about 0.1 micron to about 200 microns may be used to fill the recess(es). Optionally, binder materials such as alcohols, or any other binder material that may be used in the art may be added to the abrasive particles to form a slurry. The abrasive particles/slurry is packed into the recess(es) so as to at least partially fill the recess(es) of the blank. In embodiment, the recess(es) may be completely filled or even overfilled with abrasive particles/slurry.

After the PCD or PCBN powder or PCD or PCBN slurry is placed in the recess(es), high pressure and high temperature are applied to form the powder/slurry into the form of the recess(es). The material from which the blank is made effectively fuses the PCD or PCBN material to the blank. The PCD or PCBN material that has been fused to the blank acts as an integral part thereof.

Figure 10:
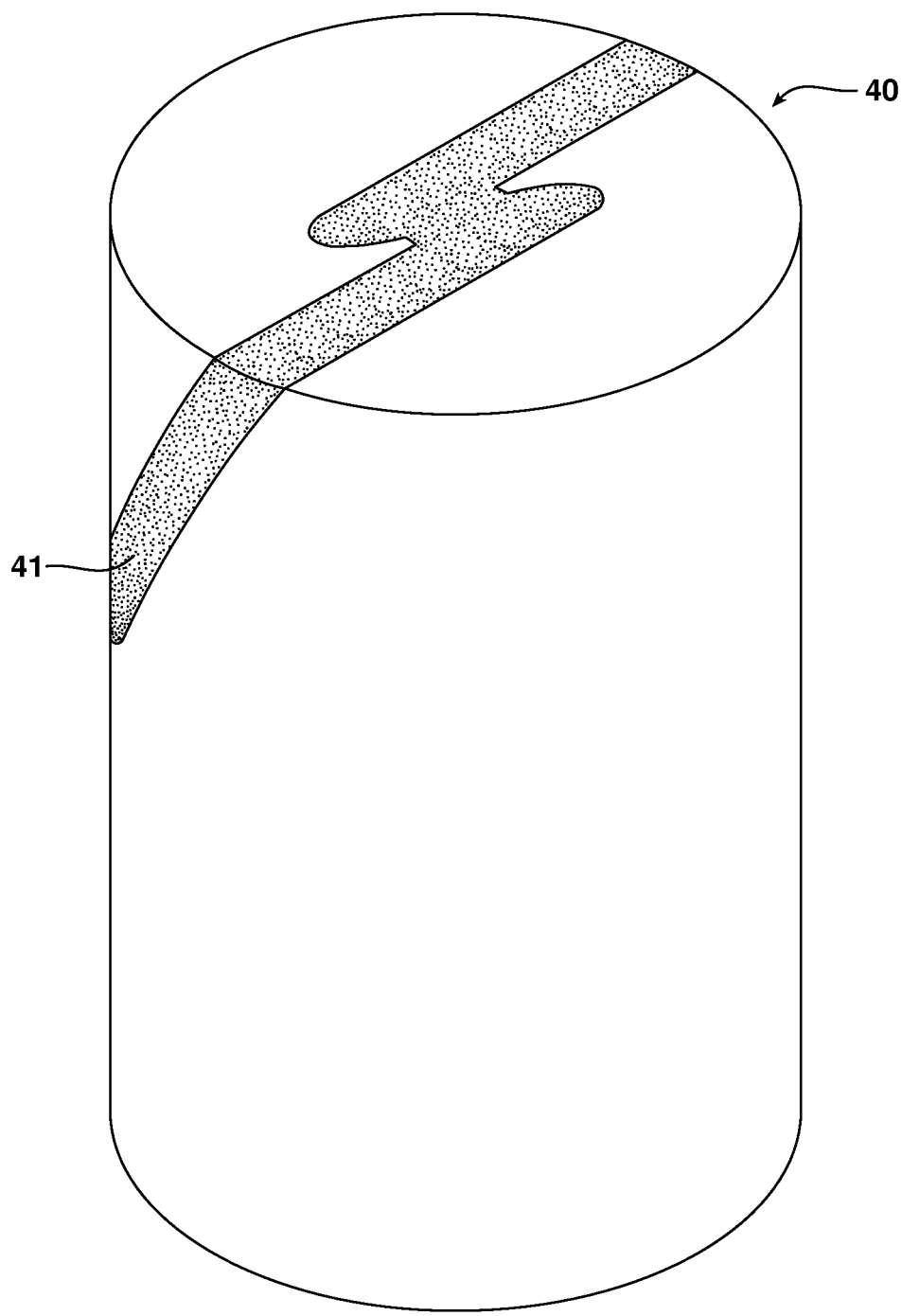
FIG. 10 is a perspective view of the as-sintered machining tool blank.

The blank containing PCD or PCBN powder or slurry may be subjected to pressures of about 45 Kbar to about 75 Kbar and temperatures of about 1200° C. to about 1600° C. for approximately about 1 to about 50 minutes. Apparatus and techniques for such sintering are disclosed in U.S. Pat. Nos. 2,941, 248; 3,141,746; 3,745,623; and 3,743,489 which are herein incorporated herein by reference. When the abrasive mass is fully sintered, with the particles bonded directly to each other and to the carbide by the sintering process, the blank is removed from the press. As shown in FIG. 10, the resultant composite sintered abrasive blank is made up of a cemented carbide cylinder 40 with a at least one vein of fully sintered abrasive particles 41 imbedded in and extending across one end of the blank thereof.

Figure 3:
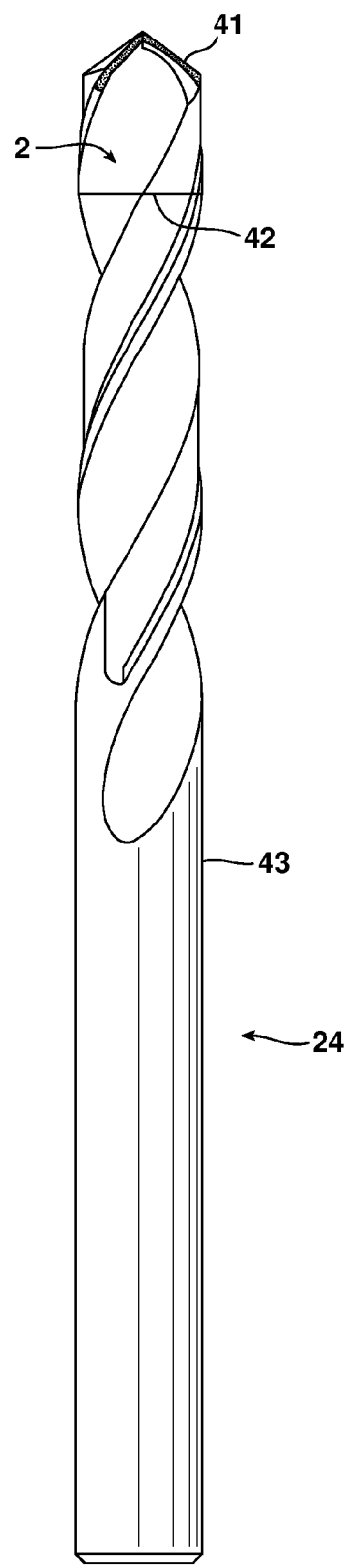
FIG. 3 is a side plan view of an embodiment of a drill bit.

FIG. 3 depicts a machining tool 24 made from the machining tool blank as described herein. Blank 2 is bonded to shank 43 by any means including, but not limited to brazing or bonding. In FIG. 3, blank 2 is bonded to shank 43 at bond line 42. The tool is then machined to form the final tool 24.

Figure 9A:
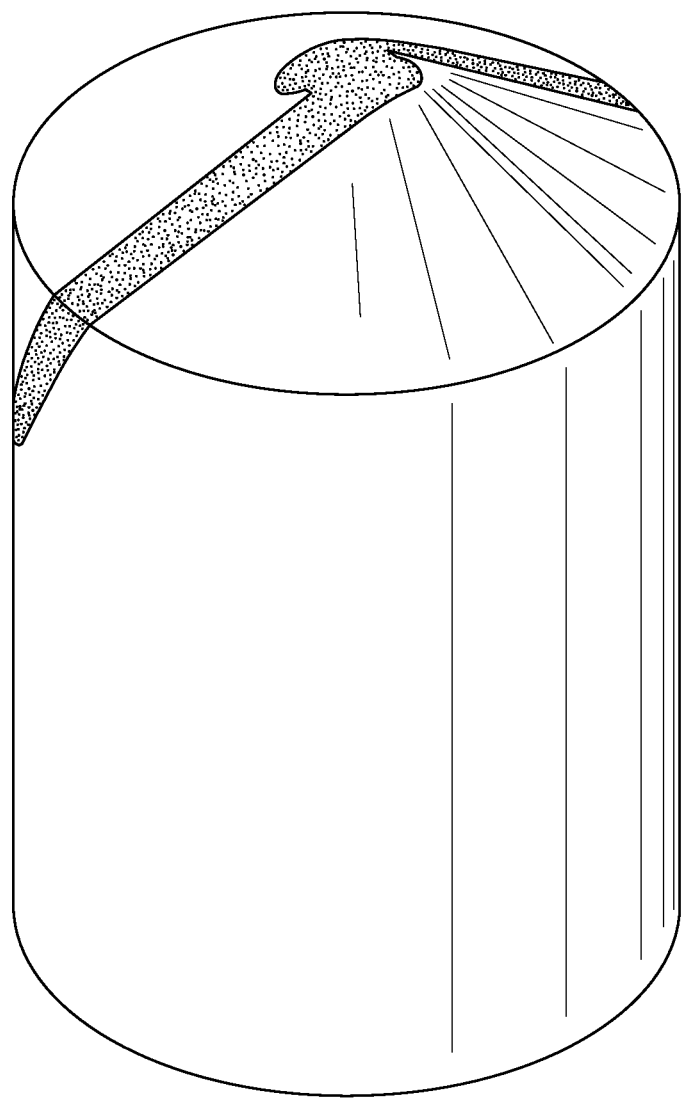
FIG. 9a is a side view of a profile of an embodiment of a machining tool blank.
Figure 9B:
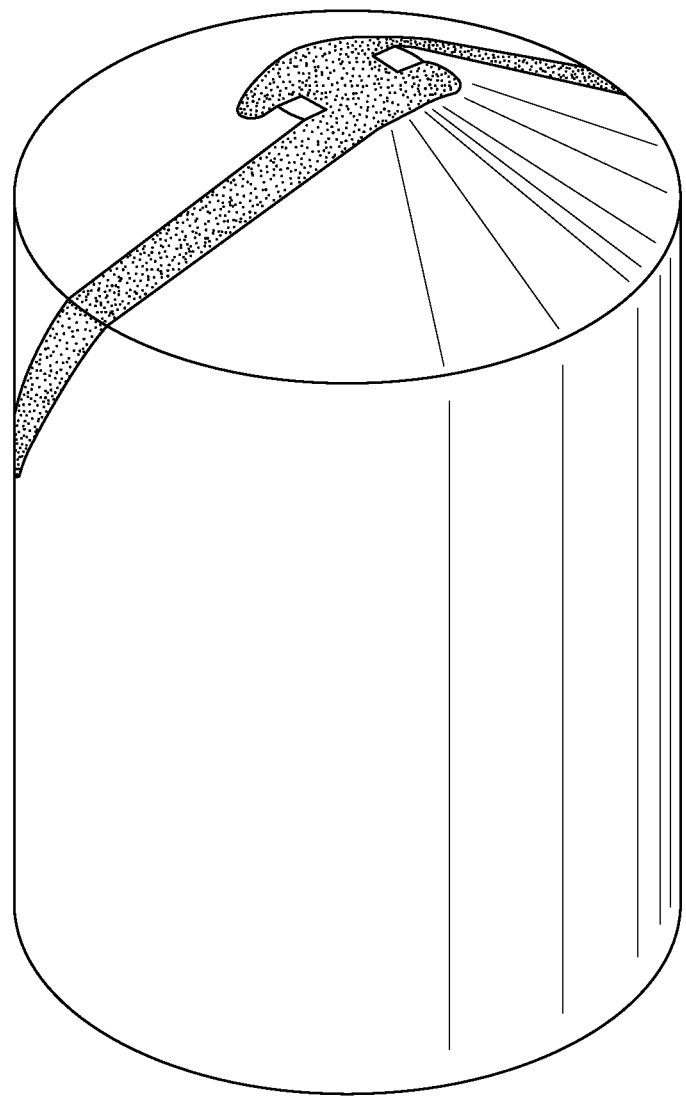
FIG. 9b is a side view of a profile of an embodiment of a machining tool blank.

In an embodiment, the end face may be machined to contain a chamfer, FIG. 9a, or a plurality of chamfers, see FIG. 9b. The blank may be machined either before or after filling the recess(es) with PCD or PCBN and sintering to create the alternative profiles.

It has been found that machining tool blanks fabricated as detailed above, exhibit decreased cracking during high pressure, high temperature processing of the blank. Further, an increased production yield has been observed. Based on models, machining tool blanks having multiple recesses fabricated from the design depicted in FIG. 9a exhibit 60% less stress (leading to defects) compared to blanks containing a single recess.

The end face of the blank in which the recess is provided can be of any required form depending on the subsequent tool to be formed. For example, if the tool to be formed is a twist drill the end face may have a conical shape and typically the angle of the bottom surface of the recess and the slope of the bottom face of the element will match that of the top face. The top face of the element which is formed may match the angle of the conical tip of the blank due to the pressing action of the forming apparatus which can be a conventional mould press for this purpose. The angle of the conical tip is dependent upon the specific purpose for the tool but one common angle is 118 degrees. If the tool to be formed is a recess drill or end mill as opposed to a twist drill no conical tip will be formed.

In some instances, it is possible that the blank may be provided with an integral shank. The blank as described above may be connected to a shank portion which may be formed of another material such as a suitable cemented carbide, a ceramic, an elemental metal or alloy depending upon the specific requirements for the tool. In order for the blank to be joined to the shank portion to form the machining tool one option is to perform a brazing operation or other suitable joining operation. The shank can be made of any suitable material such as carbide, steel or steel alloy.

The blank, once formed, may be joined to the shank to form the machining tool by brazing and can be machined prior to attachment to the body shank portion such that the flutes and machining faces are formed therein. The blank then may be attached to the shank and the remaining required flutes then formed in the shank. Alternatively, the blank is first joined to the shank and the machining faces then formed in blank and the shank as it is easier from a manufacturing standpoint to align the machining faces and flutes formed.

Cutting tools, end mills, brad points and dental tools, i.e., dental burs may also benefit from the design as described with modifications as necessary. For example, an end mill may have an angle C of between about 0° to about 60°, a brad mill may have an angle C of any negative angle measurement to 0° and a dental bur may have an angle C of from about 60° to about 90°.

Equivalents

Although the invention has been described in connection with certain exemplary embodiments, it will be evident to those of ordinary skill in the art that many alternatives, modifications, and variations may be made to the disclosed invention in a manner consistent with the detailed description provided above. Also, it will be apparent to those of ordinary skill in the art that certain aspects of the various disclosed example embodiments could be used in combination with aspects of any of the other disclosed embodiments or their alternatives to produce additional, but not herein explicitly described, embodiments incorporating the claimed invention but more closely adapted for an intended use or performance requirements. Accordingly, it is intended that all such alternatives, modifications and variations that fall within the spirit of the invention are encompassed within the scope of the appended claims.

The invention claimed is:

1. A blank for use in forming a machining tool comprising:
a body comprising at least one end face; and
a recess formed in said at least one end face
comprising a first part of the recess wherein said first part of the recess extends from the at least one end face at an angle of about 15° to about 60° and a second part of the recess continuing from said first part of the recess extending from the at least one end face at an angle of about 40° to about 90° wherein said first part of the recess and said second part of the recess converge at a first radius; the recess further comprising a first side part extending from the second part
wherein said first side part extends along at least one side of said blank from an axial center point of said blank at an angle of about 5° to about 50°; a third part of the recess extending from the at least one end face at an angle of about 15° to about 60° wherein a fourth part of the recess continuing from said third part of the recess extending from the at least one end face at an angle of about 40° to about 80° wherein said third part of the recess and said fourth part of the recess converge at second radius;

the recess further comprising a second side part extending from the fourth part, wherein said second side recess extends along at least one side of said blank from an axial center point of said blank at an angle of about 5° to about 50°, and a cavity positioned between the first part of the recess and the third part of the recess.

2. A blank for use in forming a machining tool comprising:
a body comprising at least one end face;
a recess having a first part formed in said at least one end face wherein said first part of the recess extends from the at least one end face at an angle C of about 15° to about 60°; and
a second part of the recess spaced from the at least one end face and continuing from said first recess extending from the at least one end face at an angle B of about 40° to about 90°.

3. The blank according to claim 2, wherein said first part of the recess and said second part of the recess converge at a first radius.

4. The blank according to claim 3, wherein the recess has a first side part extending from the second part.

5. The blank according to claim 4, wherein said first side part extends along at least one side of said blank from an axial center point of said blank at an angle A of about 0° to about 50°.

6. The blank according to claim 5 wherein said blank further comprises a third part of the recess extending from the at least one end face at an angle of about 15° to about 60° wherein a fourth part of the recess continuing from said third part of the recess extending from the at least one end face at an angle of about 40° to about 80°.

7. The blank according to claim 6, wherein said third part of the recess and said fourth part of the recess converge at a second radius.

8. The blank according to claim 7, wherein the recess has a second side part extending from the fourth part.

9. The blank according to claim 8, wherein said second side part extends along at least one side of said blank from an axial center point of said blank at an angle F of about 0° to about 50°.

10. The blank according to claim 6, wherein a cavity is located between said first part of the recess and said third part of the recess.

11. The blank according to claim 10, wherein said cavity is circular.

12. The blank of claim 6, wherein said first part of the recess, said second part of the recess, said third part of the recess and said forth part of the recess have a width of about 0.3 mm up to about 1.5 mm.

13. The blank according to claim 2, wherein the angle C is about 33°.

14. The blank according to claim 2, wherein the angle B is about 77°.

15. The blank according to claim 2, wherein a PCD or PCBN material is placed to fill the recess in the blank, the PCD or PCBN material then subjected to sufficient pressure and heat to cause the PCD or PCBN material to fuse with the blank.

16. The blank of claim 2, wherein said body is a body of rotation.

17. The blank of claim 16, wherein said recess has a width that ranges from about 2% to about 30% of a diameter of the at least one end face of the blank.

18. The blank according to claim 2, wherein the blank is formed of a carbide material.

19. A method for forming a machining tool blank for a machining tool, the method comprising the steps of:
forming a blank having a shape and in at least one of a first end face or a second end face forming a recess wherein said first part of the recess extending from the at least one end face at an angle of about 15° to about 60° and forming a second part of the recess spaced from the at least one end face and continuing from said first part of the recess extending from the at least one end face at an angle of about 40° to about 90°;
filling the recess at least partially with PCD or PCBN material; and
applying high pressure and high temperature to said blank and said PCD or PCBN material to fuse the PCD or PCBN with the blank forming a sintered blank.

20. The method of claim 19, wherein the shape is a cylindrical shape.

21. The method of claim 19, further comprising the step of providing a material from a transition group of elements.

22. The method of according to claim 19, wherein said first part of the recess and said second part of the recess converge at a first radius.

23. The method according to claim 22, wherein said blank further comprises a third part of the recess extending from the at least one end face at an angle of about 15° to about 60° wherein a fourth part of the recess continuing from said third recess extending from the at least one end face at an angle of about 40° to about 80°.

24. The method according to claim 23, wherein a cavity is positioned between said first part of the recess and said third part of the recess.

25. The method according to claim 24, wherein said cavity is circular.

26. The method of claim 23, wherein said first part of the recess, said second part of the recess, said third part of the recess and said forth part of the recess have a width of about 0.7 mm up to about 1.0 mm.

27. The blank according to claim 19, wherein the recess has a first side part extending from the second part.

28. The method according to claim 27, wherein said first side part extends along at least one side of said blank from an axial center point of said blank at an angle of about 15° to about 50°.

29. The method according to claim 27, wherein said third part of the recess and said fourth part of the recess converge at second radius.

30. The blank according to claim 29, wherein the recess has a second side part extending from the fourth part.

31. The blank according to claim 30, wherein said second side part extends along at least one side of said blank from an axial center point of said blank at an angle of about 5° to about 50°.

32. The method according to claim 19, wherein the angle said first part of the recess extends from said at least one end face is about 33°.

33. The method according to claim 19, wherein the angle said second part of the recess continuing from the first part of the recess extends from said at least one end face is about 77°.

34. The method of claim 19, wherein said shape is a cylinder of rotation.

35. The method of claim 34, wherein said recess has a width that ranges from about 2% to about 20% of a diameter of the ends faces of the blank.

36. The method according to claim 19, wherein the blank is formed of a carbide material.

\* \* \* \* \*